(12) United States Patent
Hirano

(10) Patent No.: US 6,247,810 B1
(45) Date of Patent: Jun. 19, 2001

(54) HINGE FOR EYEGLASSES

(75) Inventor: Kazuo Hirano, Tokyo (JP)

(73) Assignee: Maruman-Optical Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/400,832

(22) Filed: Sep. 21, 1999

(51) Int. Cl.[7] .................................................. G02C 5/22
(52) U.S. Cl. ............................................ 351/153; 16/228
(58) Field of Search .................................... 351/153, 119, 351/121; 16/228

(56) References Cited

U.S. PATENT DOCUMENTS 3,025,762 * 3/1962 Vigano ................................. 351/153

FOREIGN PATENT DOCUMENTS 5-164993 * 6/1993 (JP) ...................................... 351/153

* cited by examiner

*Primary Examiner*—Huy Mai
(74) *Attorney, Agent, or Firm*—Arent Fox Kintner Plotkin & Kahn, PLLC

(57) ABSTRACT

A washer 20 is provided with a slit portion 21 so that arm portions 22 and 22 are formed. The arm portions 22 and 22 are provided with engaging claw portions 23*a* and 23*b* which engage with an engaging step portion 27 and an engaging projecting portion 28, respectively. When the temple section 8 is moved to rotate outward against the elastic force of the arm portions 22 and 22, the arm portions 22 and 22 bend inward (a gap of the slit portion 21 becomes narrower) and the templesection 8 can be moved to rotate elastically outward within the limits of bending.

6 Claims, 2 Drawing Sheets

HINGE FOR EYEGLASSES

BACKGROUND OF THE INVENTION

1. Field of the Invention

The present invention relates to a hinge for eyeglasses having a structure in which the outer side of a bracket and a temple section which are component elements of eyeglasses can be opened further outward than in a state where they normally form the same plane.

2. Description of the Prior Art

It is known in the art to provide a spring hinge for eyeglasses where the temple sections fit elastically to the sides of a face of a person who wears eyeglasses. For example, Japanese Patent Publication No. Hei 6-64264 discloses a structure where the temple section does not rotate round a hinge axis, but at a portion serving as a fulcrum where the temple section and the bracket contact when the temple section is opened further outward than in the state where the outer side of the bracket and the temple section are in the same plane. In this structure, a hinge unit forming the hinge is arranged to slide onto the temple section when the temple section is opened outward relative to the bracket.

Further, in the hinge for eyeglasses adapted to elastically fit the temple sections to the sides of the face of the person who wears the eyeglasses as described above, Japanese Utility Model Application Open-Publication No. Sho. 64-3820 discloses a simple structure in which the temple section is moved to rotate both outward and inward by penetratingly rotating a flat portion of the bracket relative to a side groove which opens to the outside of the temple section.

However, in the conventional hinge, Japanese Patent Publication No. Hei 6-64264 discloses the structure where dovetail groove working is required to cause the hinge unit to slide surely onto the temple section. Therefore, the manufacturing cost is high. Further, since the dovetail groove or complicated working is required in a narrow section of the small parts of the eyeglasses, the mechanical strength for the eyeglasses as a whole and at the hinge part thereof becomes a problem.

Also, the hinge disclosed in Japanese Utility Model Application Open-Publication No. Sho. 64-3820 has an advantage in its simple structure, but there are some appearance and design problems as shown below: A side groove of the hinge portion is exposed to affect a sense of unity as a whole which is an important factor for a design of eyeglasses. In addition, the flat portion of the bracket protrudes in a folding condition of the temple section when the eyeglasses are not used and this is another design problem to be solved.

SUMMARY OF THE INVENTION

It is an object of the present invention to solve the above-mentioned problems and to provide a simplified hinge structure for eyeglasses.

It is another object of the present invention to provide a hinge for eyeglasses which has no parts with a feeling that something is superficially wrong as eyeglasses and can enhance a sense of unity and a sense of quality.

It is still another object to provide a hinge for eyeglasses having a structure where the outer side of a bracket and a temple section can be smoothly opened further outward than in the state where they normally form the same plane.

To accomplish these objects, according to the present invention, a hinge for eyeglasses is provided on a bracket and a temple section, which comprises an outer hinge member, an inner hinge member adapted to be inserted into a part of the outer hinge member, and a rotation axis member for passing through the outer hinge member and the inner hinge member and supporting both the outer hinge member and the inner hinge member to cause the outer hinge member to move to rotate relative to the inner hinge member, wherein a flat member formed with a slit at its portion and provided with two elastic arm portions is disposed between the outer hinge member and the inner hinge member, and one of the elastic arm portions is arranged to engage with a portion of the outer hinge member and the other of the elastic arm portions is arranged to engage with a portion of the inner hinge member, and wherein when the temple section is opened outward relative to the bracket, the slit becomes narrower to apply an elastic force on each engaging portion.

The above and other objects, features and advantages of the present invention will become apparent from the following description when taken in conjunction with the accompanying drawings.

DESCRIPTION OF THE PREFERRED EMBODIMENT

Figure 1:
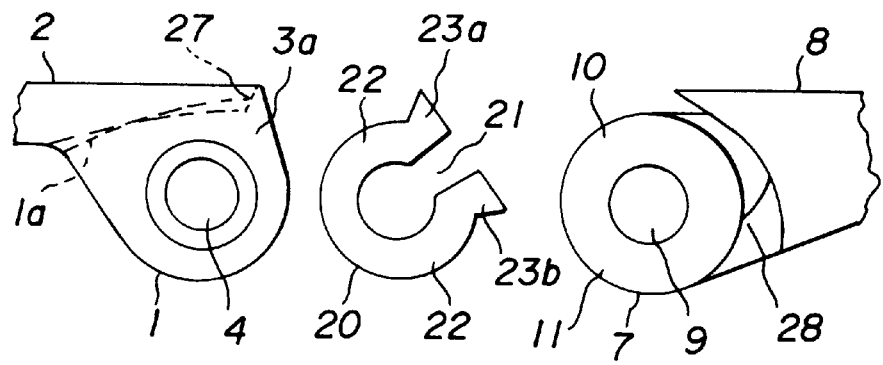
FIG. 1 is a plan view showing a hinge portion for eyeglasses in an exploded manner to explain a preferred embodiment of the present invention.

A preferred embodiment of the present invention will be described below referring to the drawings.

Figure 2:
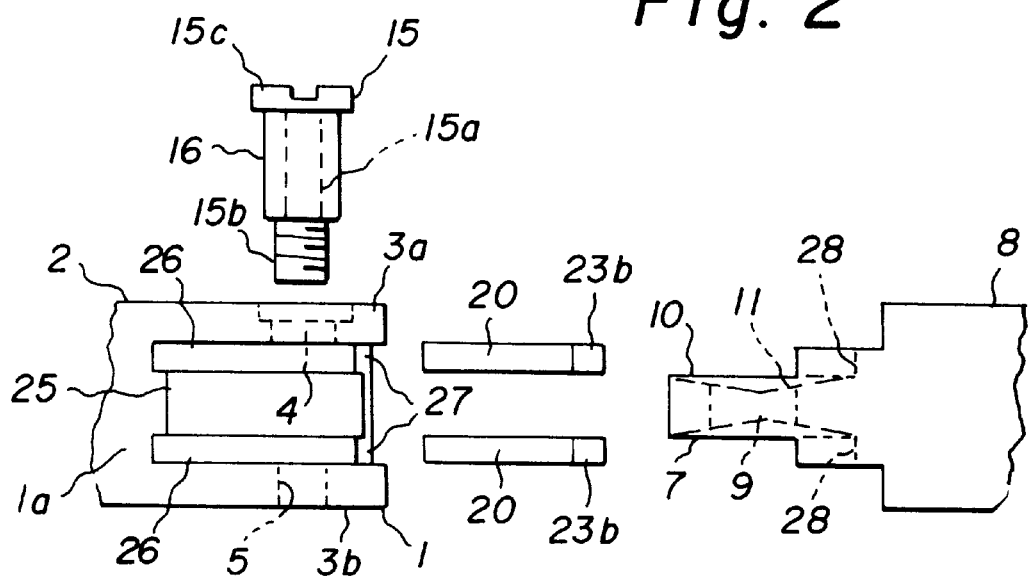
FIG. 2 is a front view showing the hinge portion for eyeglasses according to the present embodiment in an exploded manner.

FIG. 1 is a plan view showing a hinge portion for eyeglasses in an exploded manner to explain one embodiment of the present invention. FIG. 2 is a front view showing the hinge portion for eyeglasses in an exploded manner and FIG. 3 is a partially sectional planar view showing the hinge portion for eyeglasses in an assembled manner.

Figure 3:
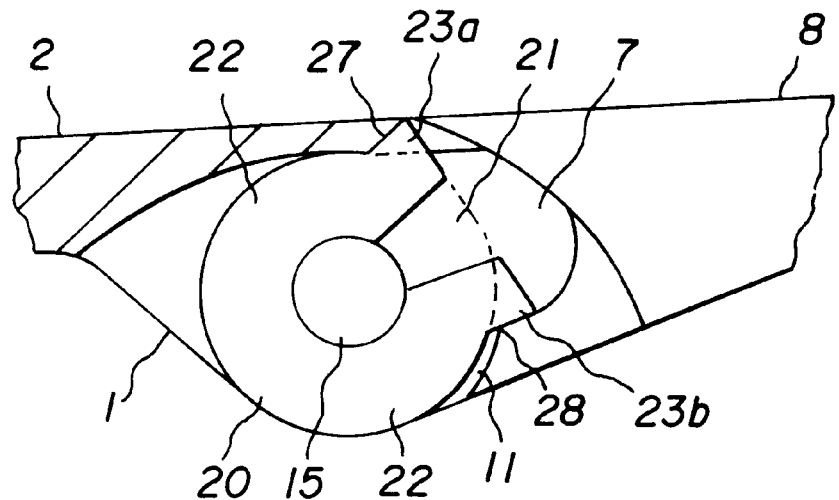
FIG. 3 is a partially sectional planar view showing the hinge portion for eyeglasses according to the present embodiment in an assembled manner.

In FIGS. 1 through 3, reference numeral 1 is an outer hinge member provided on a bracket 2 which is fixedly secured to the side of a lens holding frame (not shown). An inner wall 1a is protrusively provided with a pair of receiving portions 3a, 3b. The upper receiving portion 3a is provided with a through-hole 4 and the lower receiving portion 3b is provided with a threaded hole 5 having a female thread formed.

Reference numeral 7 is an inner hinge member provided on a temple section 8. The inner hinge member 7 is provided a through-hole 9 in the center and further provided with an inserting portion 10 which has almost the same outer shape as the receiving portions 3a, 3b. Formed on the circumference of the through-hole 9 is a cone-shaped recess 11.

Numeral 15 is a male screw serving as a rotation axis member. A shank 15a of the male screw 15 is provided to cover by a cylindrical body 16 made of synthetic resin with elasticity. The male screw 15 is provided with a thread portion 15b at the lower portion thereof.

20 is a washer of a flat member made of materials having super-elasticity characteristics such as Ni—Ti alloy, or of stainless steel. The washer 20 of a ring shape is formed with a slit 21 at its one part and provided with a pair of arm portions 22, 22 having elasticity. Projectingly armed on the outer end of the pair of arm portions 22, 22 are engaging claw portions 23a, 23b.

Further, in a condition where the inner hinge member 7 is inserted between the receiving portions 3a and 3b of the inner wall 1a of the outer hinge member 1, a first groove portion 25 is provided to cause the inner hinge member 7 to move to rotate without difficulty, and a pair of second groove portions 26 are formed to receive the washers 20. Formed on the ends of the second groove portions 26 are engaging claw portions 27 with which the engaging claw portion 23a which is one of the arm portions 22, 22 of the washer 20 is engaged. Moreover, formed at one portion of the upper and lower surfaces of the inserting portion 10 of the inner hinge member 7 is an engaging projecting portion 28 to engage with the other engaging claw portion 23b of the arm portions 22, 22 of the washer 20.

A method of assembling the hinge with the above-mentioned structure will be explained below with reference to FIG. 3.

First, the inserting portion 10 of the inner hinge member 7 is inserted into the first groove portion 25 between the receiving portions 3a and 3b of the outer hinge member 1. Then, the washers 20, 20 are respectively inserted into both second groove portions 26 of the outer hinge member 1. With this insertion, the washers 20, 20 are disposed between the inserting portion 10 of the inner hinge member 7 and the receiving portions 3a, 3b. Further, the engaging claw portions 23a, 23b of the arm portions 22, 22 of the washers 20 engage with an engaging step portion 27 and the engaging projecting portion 28, respectively.

In the condition stated above, positioning of the through-hole 4 and the threaded hole 5 of the outer hinge member 1 with the through-hole 9 of the inner hinge member 7 is made to insert the male screw 15. The head 15c of the male screw 15 now engages with the circumference of the through-hole 4 of the upper receiving portion 2a so that the thread portion 15b can be screwed in the threaded hole 5 of the lower receiving hole 3b.

In this situation, all the members are connected to serve as a hinge. Normally, the outer hinge member 1 and the inner hinge member 7 are arranged to rotatably move round the male screw 15 serving as a pivot between the position where the outer surface of both hinge members 1 and 7 are on the same plane as shown in FIG. 3 and the position where the temple section 8 is being folded.

Figure 4:
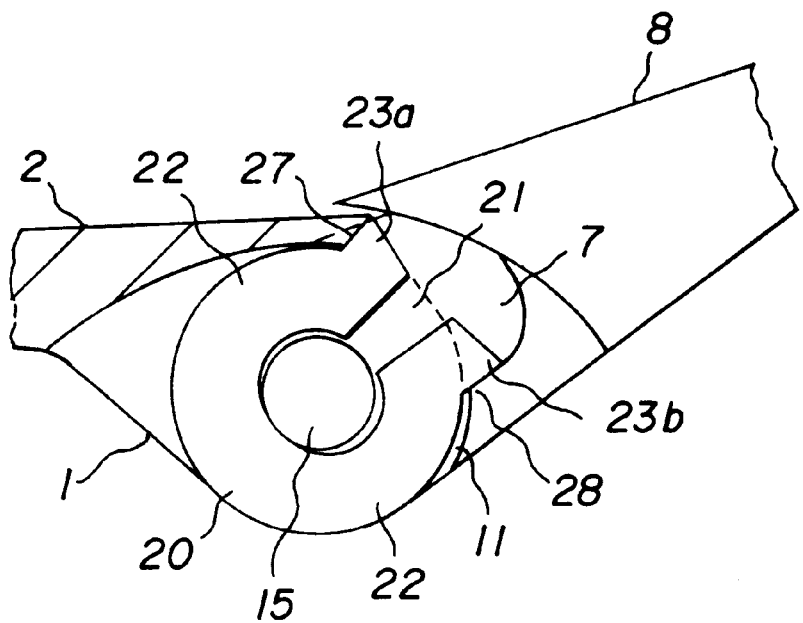
FIG. 4 is a partially sectional planar view showing the hinge portion for eyeglasses according to the present embodiment in an outwardly rotated state.

As shown in FIG. 4, when the temple section 8 is rotated to move further outward than the state shown in FIG. 3, the engaging claw portions 23a and 23b of the arm portions 22 and 22 of the washer 20 engage with the engaging step portion 27 and the engaging projecting portion 28, respectively. Since the washer 20 is however formed with the slit portion 21, the arm portions 22 and 22 bend inward (i.e. the gap of the slit portion 21 becomes narrower) by moving to rotate the temple section 8 outward against the elastic force of the arm portions 22 and 22 and as a result, the temple section 8 can be elastically rotated to move outward within the limits of the bending.

When the temple section 8 is moved to rotate, the washer 20 causes some deformation, but the deformation does not affects the rotational movement of the hinge because the cone-shaped recess portion 11 formed on circumference of the through-hole 9 of the inner hinge member 7 serves as an escape path. Further, since the shank 15a of the male screw 15 is provided with the cylindrical body 16 made of synthetic resin with elasticity, this cylindrical body 16 serves as a cushion for the hinge to stabilize the elastic action of the washer 20.

As described above, according to the present invention, the flat member provided with a slit portion at a part thereof and formed with two elastic arm portions is disposed between the outer hinge member and the inner hinge member. One of the elastic arm portions engages with a portion of the outer hinge member and the other of the elastic arm portions engages with a portion of inner hinge member. When the temple section is opened outward relative the bracket, the slit portion is designed to become narrower to apply the elastic force to each engaging portion. Thus, it is possible to provide a hinge for eyeglasses which is simple in structure, has no parts with a feeling that something is superficially wrong for eyeglasses, and can enhance a sense of unity and a sense of quality. It is also possible to smoothly open the outer surface of the bracket and the temple section further outward than in the state where they normally form the same plane.

What is claimed is:

1. A hinge for eyeglasses provided at a bracket and a temple section comprising an outer hinge member, an inner hinge member adapted to be inserted into a part of the outer hinge member, and a rotation axis member for passing through the outer hinge member and the inner hinge member and supporting both the outer hinge member and the inner hinge member to cause the outer hinge member to rotatably move relative to the inner hinge member, wherein a flat member provided with a slit at a part thereof and formed with two elastic arm portions is disposed between the outer hinge member and the inner hinge member, and one of the elastic arm portions is arranged to engage with a portion of the outer hinge member and the other is arranged to engage with a portion of the inner hinge member, and wherein when the temple section is opened outward relative to the bracket, the slit becomes narrower to apply an elastic force on each of the engaging portions.

2. A hinge for eyeglasses according to claim 1, wherein the flat member is made from metals having elasticity.

3. A hinge for eyeglasses according to claim 2, wherein the flat member is made from an alloy of nickel and titanium.

4. A hinge for eyeglasses according to claim 1, wherein the elastic arm portions are provided with engaging claw portions adapted to engage with the engaging portions to keep the flat member in place.

5. A hinge for eyeglasses according to claim 1, wherein at least the circumference of the rotation axis member where the flat member is disposed is provided with a synthetic resin material with elasticity.

6. A hinge for eyeglasses according to claim 1, wherein at least either surface of the outer hinge member and the inner hinge member between which the flat member is disposed is formed with a cone-shaped recess for receiving any deformed portion of the flat member.

* * * * *